April 24, 1928.

G. L. MATHER 1,667,263

TIRE BUILDING APPARATUS

Filed May 15, 1922

GEORGE L. MATHER
INVENTOR

BY Hadley Freeman
ATTORNEY

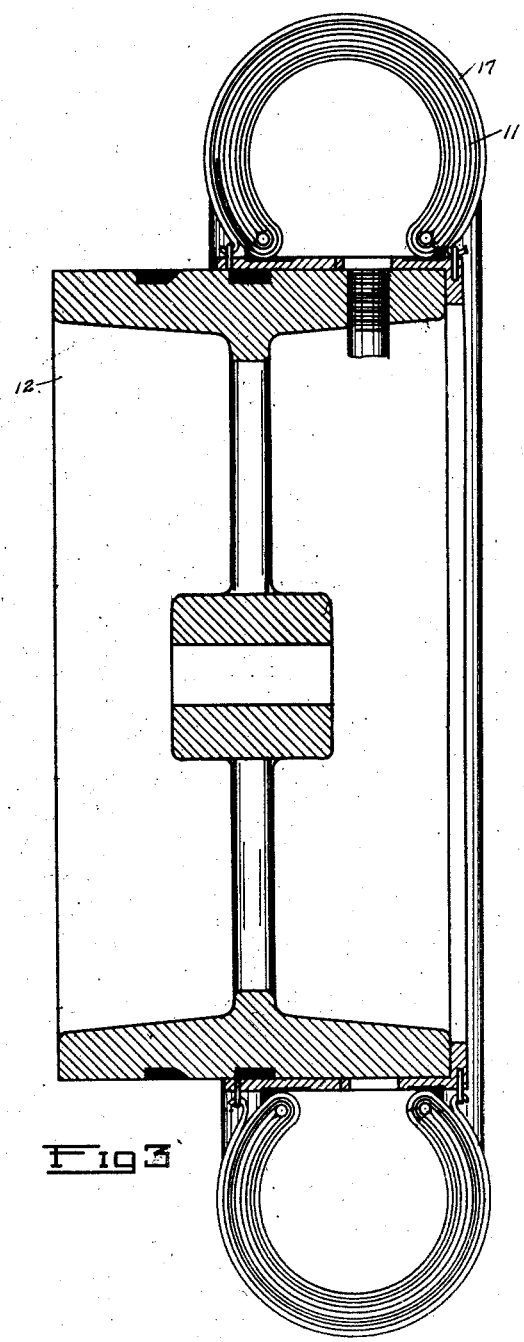

Patented Apr. 24, 1928

1,667,263

UNITED STATES PATENT OFFICE.

GEORGE L. MATHER, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

TIRE-BUILDING APPARATUS.

Application filed May 15, 1922. Serial No. 560,892.

One method of building tires comprises forming the carcass flat on a so-called pulley and then expanding the carcass into toric shape. My invention relates to this method of tire building. In the drawings accompanying this specification and forming a part thereof I have shown, for purposes of illustration, one form which my invention may assume. In these drawings:

Figure 1 shows a carcass lying flat upon the pulley,

Figure 2 shows the carcass partially expanded, while

Figure 3 shows the carcass expanded.

Figures 1, 2:
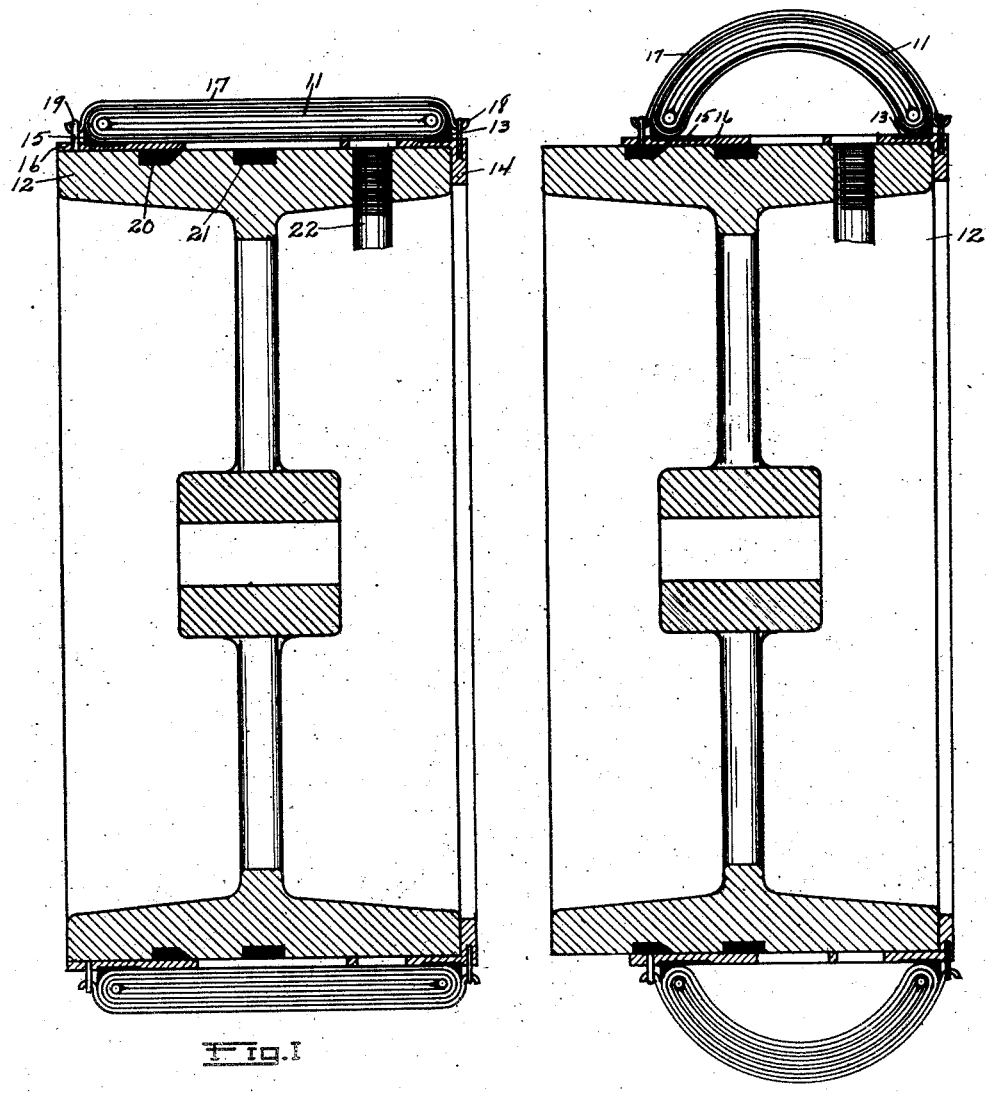

In Figure 1 the carcass 11 is shown as a flat band lying on the pulley 12 and ready to be expanded into toric shape. One edge of the carcass 11 is shown as engaging an annular packing 13 secured to a ring 14 unitary with the pulley 12 while the other edge of the carcass 11 is shown as engaging a similar packing 15 secured to a similar ring 16 movable across the face of the pulley 12. The carcass 11 is held in close engagement with the packings 13 and 15 by a plurality of straps 17 extending between hooks 18 on the ring 14 and hooks 19 on the ring 16. Similarly, a tight joint is produced between the ring 16 and the pulley 12 first by the close fit of the ring and pulley themselves and second by the packing rings 20 and 21 recessed into the face of the pulley 12 and so positioned that at least one is always in engagement with the ring 16 as it is moved across the face of the pulley 12. The pulley 12 is also provided with a duct 22 adapted to be connected to any suitable source of fluid pressure and opening into the space between the pulley 12 and the carcass 11.

In operation, after the carcass has been assembled on the pulley and the straps positioned as shown in Figure 1, fluid is introduced through the duct 22. In the absence of the inextensible straps 17 this fluid would move the carcass 11 away from the packings 13 and 15 and escape but the straps 17 prevent this escape and the confined fluid is thus forced to exert pressure against the entire inner surface of the carcass 11 and in this manner to expand the carcass 11 away from the drum as shown in Figure 2 which figure also illustrates how the straps 17 continue to hold the edges of the carcass 11 against the packings 13 and 15 and cause the ring 16 to slide across the face of the pulley 12 to keep the packing 13 continually beneath the edge of the carcass 11. The introduction of fluid is continued until the carcass 11 finally assumes the substantially toric shape shown in Figure 3.

It will be apparent from the above description that I have invented certain improvements in building by the herein considered method. This disclosure is, however, illustrative only and my invention is not limited thereto.

I claim:

1. A pulley adapted to support a tire carcass and provided with means adapted to seal the edges of the carcass to the pulley.

2. A pulley adapted to support a carcass, a ring freely slidable across the face of the pulley and engaging one edge of the carcass, a fixed abutment on the pulley engaging the other edge of the carcass and means for introducing air directly between the pulley and the carcass.

3. A pulley adapted to support a carcass, a ring freely slidable across the face of the pulley and in fluid tight contact therewith, and inextensible means connecting said ring with points in fixed relation with said pulley.

4. A pulley adapted to support a carcass, a ring freely slidable across the face of the pulley, means to maintain the edges of said carcass respectively in fluid tight contact with said ring and said pulley and means for introducing fluid pressure directly between the pulley and the carcass.

5. A pulley adapted to support a carcass, a ring slidable across the face of the pulley, and inextensible means connecting said ring with points in fixed relation with said pulley.

6. A pulley adapted to support a carcass, and means associated with the pulley and in engagement with the edges of the carcass to form a fluid tight chamber between the carcass and the pulley.

7. A pulley adapted to support a carcass, means adapted to seal the edges of the carcass to the pulley and means to admit fluid pressure between the carcass and pulley.

8. A method of forming and stretching a tire carcass, consisting of building the carcass flat upon a circular drum, holding one edge only of the carcass to the drum, expanding the central portion of the carcass only in a circumferential direction, the expansion of the carcass centrally moving the carcass across the drum to one side thereof.

9. A method of forming and stretching a tire carcass, consisting of building a carcass flat upon a circular drum, holding one edge only of the carcass to the drum, expanding the carcass centrally so that the opposite edge moves over beyond the center of the drum towards the held edge, and the completed expanded tire occupying one peripheral edge of the drum.

10. The method of forming and stretching a tire carcass consisting of building a carcass flat upon a circular drum holding one peripheral edge only of the carcass, expanding the carcass centrally of the form to cause the major portion of the carcass to pull across the major surface of the drum.

In testimony whereof I have signed my name to the above specification.

GEORGE L. MATHER.